United States Patent [19]

Pirie et al.

[11] Patent Number: 5,122,989
[45] Date of Patent: Jun. 16, 1992

[54] DIGITAL ECHO REPEATER

[75] Inventors: David M. Pirie, Norwich; Christopher W. Brown, Oakdale, both of Conn.

[73] Assignee: The United States of America as represented by the Secretary of the Navy, Washington, D.C.

[21] Appl. No.: 766,599

[22] Filed: Sep. 26, 1991

[51] Int. Cl.$^5$ .................. H04B 1/59; H04B 17/00
[52] U.S. Cl. ............................................. 367/2; 367/13
[58] Field of Search .............. 367/2, 1, 13; 434/10, 434/6; 73/1 DV

[56] References Cited

U.S. PATENT DOCUMENTS

| 3,421,137 | 1/1969 | Rathbun, Jr. | 367/2 |
| 3,555,165 | 1/1971 | Ettenhofer et al. | 367/2 |
| 3,721,949 | 3/1973 | Hubbard et al. | 367/2 |

Primary Examiner—Daniel T. Pihulic
Attorney, Agent, or Firm—Michael J. McGowan; Prithvi C. Lall; Michael F. Oglo

[57] ABSTRACT

The present invention relates to an echo repeater/beacon system for use on-board marine vessels and platforms. The system includes a hydrophone for receiving an incoming acoustic signal from a remote station, an on-board computer for analyzing, detecting, shaping, collecting and storing up to 10 seconds of a shaped version of the incoming signal for later transmission as an echo signal, and a transmitting transducer for transmitting the echo signal. The on-board computer also is used to generate a beacon signal at a desired frequency and a desired repetition rate.

25 Claims, 1 Drawing Sheet

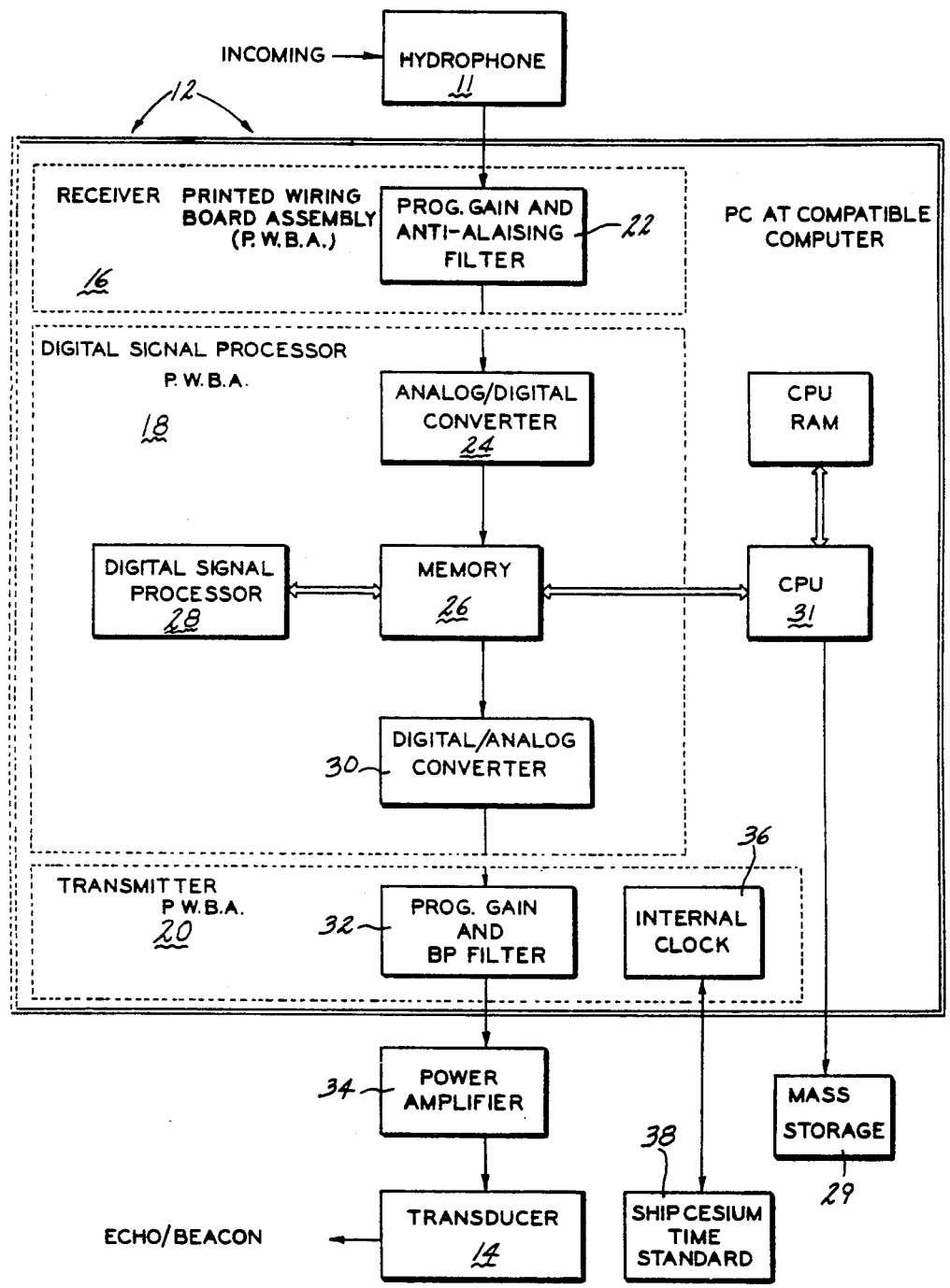

DIGITAL ECHO REPEATER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a digital echo repeater/beacon system for use with marine vessels. The system of the present invention has been found to have particular utility as part of test platforms used during sea tests of marine systems.

(2) Description of the Prior Art

Acoustic arrays such as acoustic echo repeaters for underwater communication and retransmission are known in the art. They are frequently employed to test acoustic systems and as target simulators One such underwater acoustic repeater array is illustrated in U.S. Pat. No. 3,421,137 to Rathbun et al.

The Rathbun et al. repeater array has the ability to be used as both an echo repeater and as a target simulator. It consists of three equispaced transducers supported concentrically between the apexes of a pair of truncated equilateral metallic pyramids. The outer surface of the pyramids are coated with an acoustic reflecting material and the active faces of the transducers are directed toward the coated faces. A housing having an amplifier therein is connected between two such arrays. The housing includes electrical devices for connecting in parallel one set of the transducers to the amplifier input and the output thereof to the other three transducers. The acoustic signal which is received by one set of transducers is amplified and re-radiated by the other transducer set at a higher level with a minimum of coupling therebetween.

Other acoustic target simulators are shown in U.S. Pat. Nos. 3,555,165 to Ettenhofer et al. and 3,721,949 to Hubbard et al. The Ettenhoffer et al. apparatus is capable of simulating acoustic echoes of sonar pulses from a desired selected target configuration. The apparatus includes a hydrophone whose output signal is fed to a signal processor for modifying a received sonar pulse and generating an electrical echo analogue signal which is applied to a projector for transmission. The signal processor includes a modulator for down modulating the carrier frequency of the received pulse and delay devices for delaying the pulse by varying degrees equivalent to the travel times for the pulse between successive major echo producing discontinuities in the target whose echo is being simulated to form a series of pulses. The pulses are controlled in amplitude in accordance with the appropriate target strengths for the succession of discontinuities and are fed to fill-in and summing circuits for adding white noise of desired envelope characteristics in the intervals between successive pulses to form the echo analogue signal. A second modulator shifts the frequency band of the echo analogue signal upwardly and introduces a selected Doppler shift thereinto prior to its application to the projector for acoustic transmission. Feedback elimination circuitry delays and shifts the phase of the echo analogue signal and applies the resulting signal to a summer for eliminating the effect of acoustic feedback.

Prior art test systems used in the field often fail to provide adequate data for analysis of test performance. In some systems, returns can only be obtained every few minutes when operating ranges are in excess of 100 KYards. When obtained these returns are often not detectable due to low signal level and infrequent and unpredictable arrival times.

Prior art systems also suffer the deficiencies of being costly to produce and having little flexibility in terms of their capability.

SUMMARY OF THE INVENTION

Accordingly, it is an object of the present invention to provide an echo repeater which is capable of producing an echo signal having a relatively high signal level.

It is still a further object of the present invention to provide an echo repeater as above which has a relatively low construction cost.

It is yet a further object of the present invention to provide an echo repeater as above which has much flexibility for improvements and modifications.

It is a further object of the present invention to provide an echo repeater as above which may also function as a beacon.

These and further objects and advantages will become more apparent from the following description and drawing.

The foregoing objects and advantages are achieved by the echo repeater/beacon system of the present invention. As will be discussed in further detail hereinafter, the system of the present invention may be used on board marine vessels and platforms for performing acoustic sea tests. The system includes an on-board computer based system which provides the desired reduction in cost and flexibility.

The system of the present invention includes a hydrophone for receiving an incoming acoustic signal from a remote station and an on-board computer for analyzing, shaping, storing and generating an acoustic echo signal at a fixed gain to be transmitted back to the remote station. The system further includes means for amplifying the echo signal to be transmitted back to the remote station and a transducer for transmitting the signal.

The computer also includes means for generating a beacon signal at a desired frequency and at desired time intervals. In the event that the on-board computer wishes to transmit the echo signal and the beacon signal at the same time, means are provided to allow a system user to override one of the signals.

Details about the foregoing features and other features features of the present invention are set out in the following description.

BRIEF DESCRIPTION OF THE DRAWINGS

The figure is a schematic representation of the echo repreater/beacon system of the present invention.

DESCRIPTION OF THE PREFERRED EMBODIMENT

The echo repeater/beacon system of the present invention has been developed for use on marine vessels and platforms to be used in conjunction with other marine vessels and platforms during sea tests. The echo repeater is designed to detect, store, and after a user specified time delay, shape and retransmit an active acoustic echo signal from a source. The beacon is designed to transmit a beacon signal at a preset time, level, frequency and repetition rate, independent of any active receptions.

Referring now to the figure, the echo repeater/beacon system 10 of the present invention includes a hydrophone 11 for receiving an incoming acoustic signal such as a sonar signal from a remote station (not shown) and an onboard computer 12 for analyzing and shaping the received signal, for collecting and storing up to 10 seconds of said signal and for generating an active echo signal to be transmitted to the remote station. The system also includes a transducer 14 for transmitting the active signal.

The computer system 12 preferably comprises a system which is PC AT IBM computer compatible. The minimum requirements for this computer include that is be 80286 or 80386 based, 12 MHz or greater, with two floppy drives, one hard drive of at least 40 Mb, a keyboard, and an EGA monitor.

As shown in the figure, the computer has a receiver printed wiring board assembly (P.W.B.A.) 16, a digital signal processing P.W.B.A. 18 and a transmitter P.W.B.A. 20. As is conventional and well known in respect to computer systems of this type, the P.W.B.A.'s and the bus to the CPU (designated 31, later herein) are interconnected by so-called back plane connector boards, allowing relatively low construction costs and much flexibility for improvements and modifications. The receiver P.W.B.A. includes programmed gain circuitry and an anti-alaising filter 22 for increasing the gain of the incoming acoustic signal and for removing noise therefrom. The programmed gain and anti-alaising filter 22 may be formed by any suitable electrical components known in the art. For example, the gain portion of this circuit may be formed by any suitable amplifier means known in the art; while the filter portion may be formed by any suitable filter means known in the art.

After the incoming acoustic signal has been amplified and filtered, it is transmitted to a 12 bit converter 24 for conversion from an analog signal into a digital signal. The converter 24 may comprise any suitable analog to digital converter known in the art.

The digitized signal is then inputted into the memory 26 of the computer. The memory 26 may be an 8 Kb RAM memory. A digital signal processor 28 connected to the computer's memory begins the process of analyzing, detecting, shaping and storing the incoming signal. Before beginning this process however, the signal processor 28 logs the signal's time of detection, detection frequency and detection sound pressure level and stores it in a mass storage device 29 for later analysis. The mass storage device 29 may be a device such as a Bernoulli disk cartridge and may be connected to the processor 28 via the memory 26 and the computer's central processing unit (CPU) 31.

The processor 28 preferably comprises an ADSP-2100 integrated circuit (I.C.) device made by Analog Devices, Inc. of Norwood, Massachusetts and which is programmable to detect a particular incoming acoustic signal having a particular frequency and a particular waveform. The programming of I.C. device 28 with respect to performance of specific functions of this type is conventional and well known. The processor analyzes the incoming signal for the desired frequency and waveform. After a detection, it then collects and stores up to 10 seconds of Fast Fourier Transform (FFT) frequency data in the band of about 700 Hz to about 1500 Hz in the memory 26, and thereupon transfers the data to the CPU RAM. The CPU uses this data to form the echo signal to be transmitted back to the remote station.

The incoming signal which is stored in the memory 26 and is to be transmitted later to the remote station is shaped and scaled by the programming in the CPU 31 during a scaling and shaping operation performed prior to transmission back to the remote station. Scaling is needed to compensate for the frequency responses of the receive hydrophone 11 and the transmit transducer 14 and to provide an overall flat response for the system. Scaling is performed by multiplying each FFT frequency in the band of interest by a factor between 0 and 1. After scaling and shaping, the digitized signal is transferred to the memory 26 for later transmission.

After a user selected time delay, usually seconds, the shaped signal is converted back to the time domain by doing an Inverse Fast Fourier Transform (IFFT), and then passed from the memory 26 to a 12 bit converter 30 for converting the digital signal back to an analog signal. The analog signal is then inputted into the transmitter P.W.B.A. 20. The transmitter P.W.B.A. 20 includes suitable means 32 for amplifying the signal by a fixed gain and means for filtering the signal to remove any noise. The filtering means may be formed by any suitable bandpass filter known in the art. By producing an echo signal at a fixed gain, the system of the present invention eliminates target strength from the sonar propagation equation.

The analog signal at the desired gain is then forwarded to the power amplifier 34, and then forwarded to the transmitting transducer 14 for transmission to the remote station.

The transmitter P.W.B.A. card 20 may include an internal clock 36 which is synchronized to the marine vessel's time standard 38 once per minute. The transmit time and other time functions of the echo repeater are derived from this internal clock 36.

In addition to its echo repeater function, the processor 28 is also programmed to act as a beacon for generating a beacon signal at user selected time intervals, i.e. preferably multiples of one minute such as every one to six minutes. The transmission times for the beacon signal is also derived from the clock 36.

To generate the beacon signal, the processor 28 may be programmed to generate an acoustic signal having a frequency in the band of from about 700 Hz to about 1500 Hz and a pulse width in the range of from about 1 second to about 15 seconds. The sound level pressure of the beacon signal may have a frequency dependent maximum of approximately 180 db/1$\mu$Pa at one meter. The beacon signal is processed via the memory 26, the converter 30 and transmitter P.W.B.A. 20. It is thence amplified by the power amplifier 34 and transmitted to the transducer 14 for transmission.

The processor 28 is preferably programmed with suitable means for allowing either the beacon signal or the acoustic echo signal to have higher priority. Such an override allows the system of the present invention to transmit the desired signal in the event both signals are scheduled to be transmitted at the same time. Typically, the beacon signal will take precedence over the echo signal.

After each beacon signal transmission, the system stores the transmission time, pulse length, current repetition rate and whether the beacon overrode an echo on the mass storage device 29.

The echo repeater/beacon system of the present invention may be calibrated prior to a sea test to provide an overall unity gain sound pressure level for the signal received at the face of the hydrophone 11 and transmitted at the face of the transducer 14.

It will be appreciated that preparation of the specific set of program instructions which processor 28 to implement the aforedescribed systems operation is within the skill of any programmer working in the art to which the present invention pertains.

The main advantages provided by the system of the present invention are cost and flexibility. Since the unit is PC based and is capable of using many off-the-shelf components, the construction cost of the system is relatively low. Being PC based also gives the unit much flexibility for improvements and modifications.

It is apparent that there has been provided in accordance with this invention a digital echo repeater which fully satisfies and implements the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An apparatus for generating an acoustic signal simulating the echo of a transmitted signal which comprises:
   first means for receiving an incoming acoustic signal generated by a remote station;
   second means for analyzing, detecting and shaping said incoming signal;
   third means for collecting and storing up to 10 seconds of said shape incoming signal; and
   fourth means for transmitting said stored signal after a fixed time delay and at a fixed gain.

2. The apparatus of claim 1 wherein said first means includes fifth means for amplifying said incoming acoustic signal and sixth means for filtering noise from said incoming acoustic signal.

3. The apparatus of claim 2 wherein:
   said apparatus includes a computer system; and
   said fifth means and said sixth means are part of a receiver printed wiring board assembly installed within said computer system.

4. The apparatus of claim 3 further comprising seventh means for converting said incoming acoustic signal from an analog signal to a digital signal.

5. The apparatus of claim 4 wherein said second and third means comprise an integrated circuit device for analyzing said digital signal to identify a particular signal having a particular waveform and a particular frequency and for collecting up to 10 seconds of said signal.

6. The apparatus of claim 5 further comprising a random access memory associated with said computer system and eighth means for transferring data about said signal to said random access memory.

7. The apparatus of claim 5 wherein said computer is programmed to scale said digital signal.

8. The apparatus of claim 7 further comprising ninth means for converting said stored signal from a digital form to an analog form.

9. The apparatus of claim 1 wherein said fourth means includes tenth means, for providing said signal to be transmitted at a predetermined gain and for filtering noise from said signal.

10. The apparatus of claim 9 wherein said fourth means further includes eleventh means for amplifying said signal.

11. The apparatus of claim 10 wherein said fourth means further includes a transmitting transducer.

12. The apparatus of claim 3 further comprising twelfth means for generating a beacon signal at a preset frequency having a selected pulse length, a predetermined amplitude and a selected repetition rate.

13. The apparatus of claim 12 wherein said twelfth means comprises a digital signal processor integrated circuit device.

14. The apparatus of claim 13 wherein said digital signal processor integrated circuit device generates a beacon signal having a frequency in the range of from about 700 Hz to about 1500 Hz and a pulse width in the range of from about 1 second to about 15 seconds.

15. The apparatus of claim 12 further comprising said twelfth means allowing a user to generate said beacon signal while overriding said fourth means for transmitting said stored signal.

16. The apparatus of claim 12 further including thirteenth means for storing the frequency of and detection data about said incoming signal and information about said beacon signal and said stored acoustic signal.

17. The apparatus of claim 16 wherein said thirteenth means includes a mass storage device.

18. The apparatus of claim 1 further including fourteenth means for logging the time of detection of said incoming signal, the frequency of said incoming signal and the detection sound pressure level of said incoming signal.

19. An echo repeater/beacon system for use on board a marine vessel which comprises:
   a hydrophone for receiving an incoming acoustic signal generated from a remote station;
   a transducer for generating a acoustic echo signal; and
   computer means aboard said marine vessel for analyzing said incoming acoustic signal, for detecting said incoming signal, for shaping said incoming signal and for collecting and storing up to 10 seconds of said shaped incoming signal, and for generating said echo signal at a fixed gain to be transmitted by said transducer back to said remote station.

20. The system of claim 1 further comprising:
   said computer means being programmed to generate a beacon signal at a preset frequency and at a selected repetition rate independently of said echo signal.

21. The system of claim 20 wherein said computer means is programmed to allow a user of said system to override said echo signal so that in the event of contention between transmission of the echo signal and the beacon signal the beacon signal will be transmitted.

22. The system of claim 20 wherein said computer means comprises a personal computer having a receiver printed wire board assembly, a transmitter printed wire board assembly, and a digital signal processor printed wire board assembly.

23. The system of claim 20 further including a mass storage device for storing information about said incoming signal, said beacon signal and said echo signal to be transmitted to said remote station.

24. The system of claim 20 further including an amplifier for amplifying said beacon signal and said echo signal to be transmitted to said remote station.

25. An apparatus for generating an acoustic signal simulating the echo of a transmitted signal which comprises:
- a hydrophone for receiving an incoming analog acoustic signal from a remote station;
- a computer for analyzing said incoming signal, for shaping said signal, for storing said shaped signal and for generating an acoustic echo signal to be transmitted back to said remote station;
- said computer comprising a receiver printed wire board assembly including an amplifier for amplifying said incoming analog acoustic signal and a filter for filtering noise from said incoming analog acoustic signal;
- said computer further comprising a digital signal processor printed wire board assembly including a first converter for converting said filtered incoming analog acoustic signal to a digital signal, a first memory for storing information about said digital signal and for storing said acoustic echo signal, a digital signal processor for processing said digital signal, and a second converter for converting a digital signal to an analog signal;
- said computer further comprising a central processing unit with a random access memory communicating with said first memory, said central processing unit being used to form said echo signal to be transmitted back to said remote station;
- said computer further comprising a transmitter printed wiring board assembly having an amplifier to amplify the echo signal being transmitted and a filter for removing noise from said echo signal; and
- a transducer for transmitting the echo signal to the remote station.

* * * * *